US006049754A

United States Patent [19]

Beaton et al.

[11] Patent Number: 6,049,754

[45] Date of Patent: Apr. 11, 2000

[54] METHOD FOR DISPLAYING VEHICLE ARRIVAL MANAGEMENT INFORMATION

[75] Inventors: Emily K. Beaton, Gaithersburg, Md.; Vick G. Fisher, Arlington, Va.; Shane L. Miller, Reston, Va.; Joseph A. Nardelli, III, Herndon, Va.; Rodney A. Simmons, Fremont, Calif.

[73] Assignee: The Mitre Corporation, McLean, Va.

[21] Appl. No.: 09/050,471

[22] Filed: Mar. 31, 1998

[51] Int. Cl.[7] .................................................... G01C 21/00

[52] U.S. Cl. .......................... 701/204; 364/439; 364/440; 364/441; 364/442; 364/443; 364/444

[58] Field of Search .................................... 340/974, 973; 395/129, 142; 701/120, 204; 364/439–444, 461

[56] References Cited

U.S. PATENT DOCUMENTS

| | | | |
|---|---|---|---|
| 5,257,347 | 10/1993 | Busbridge et al. . | |
| 5,265,023 | 11/1993 | Sokkappa | 364/439 |
| 5,420,582 | 5/1995 | Kubbat et al. . | |
| 5,659,475 | 8/1997 | Brown | 364/439 |
| 5,677,841 | 10/1997 | Shiomi et al. | 364/439 |
| 5,742,508 | 4/1998 | Kasui et al. | 364/439 |
| 5,941,929 | 8/1999 | Shiomi et al. | 701/120 |

*Primary Examiner*—William A. Cuchlinski, Jr.
*Assistant Examiner*—Ronnie Mancho
*Attorney, Agent, or Firm*—Rosenberg, Klein & Lee

[57] ABSTRACT

A method for displaying vehicle arrival management information is provided by display (200). Display (200) includes an arrival slot display area (222) which is bounded by a relative time scale (214) defining a Y axis and an actual time scale (216) defining an X axis. A multiplicity of symbols (226) representing arrival slots extends from the origin of the display. When used in an aircraft arrival management application, symbols (228) represent aircraft in flight, and symbols (230) represent aircraft still on the ground and whose flight plan is proposed. Those symbols (228, 230) are located on the display at the appropriate estimated arrival time, assigned slot time coordinates corresponding with a respective arrival time slot represented by a respective arrival slot symbol (226). To further aid in controlling the arrival traffic, each of the in-flight aircraft symbols (228) for aircraft associated with the user includes an ETA envelope (244) associated with the in-flight aircraft symbol (228), the symbol (228) being located at coordinates which represent the estimated ETA and slot assignment of the aircraft. Aircraft which have been assigned to an arrival slot, but which have not yet taken off, are indicated by a symbol (230) which is located at coordinates representing the estimated ETA and slot assignment for that flight.

20 Claims, 12 Drawing Sheets

Microfiche Appendix Included
(1 Microfiche, 22 Pages)

METHOD FOR DISPLAYING VEHICLE ARRIVAL MANAGEMENT INFORMATION

A Microfiche Appendix is included in this Application containing one (1) microfiche. The microfiche is entitled "METHOD FOR DISPLAYING VEHICLE ARRIVAL MANAGEMENT INFORMATION" containing twenty-one (21) frames plus one (1) test target frame for a total of twenty-two (22) frames.

BACKGROUND OF THE INVENTION

FIELD OF THE INVENTION

This invention directs itself to a method for temporally displaying arrival management information so that it is easily discernible by a human user. In particular, this invention is directed to a method for displaying vehicle arrival management information for use at a particular terminal to monitor and control the arrival flow of the vehicles of one particular carrier. Still further, this invention is directed to the concept of presenting data in an idealized form so that an operator can quickly and efficiently assess a situation and respond effectively thereto. The present invention graphically arriving at a resource in a visually intuitive manner. By virtue of the graphical display, traffic trend analysis is simplified and dynamic situations are readily recognized. The graphic display of the present invention assists operators in visualizing arrival delays due to congestion, as may result from discrepancies between demand for terminal resources and the terminal's capacity. More in particular, this invention is directed to a method of displaying temporal aircraft arrival and scheduling information in concert with arrival acceptance information for a particular airport that makes possible efficient arrival flow monitoring and control.

PRIOR ART

Currently, all commercial air traffic is controlled by the Government and all but minimum changes to scheduling require Governmental approval. It is, however, a shared vision of both industry and Government to afford greater freedom to the air space operators. This concept of increased freedom of flight scheduling, routing, and maneuvering envisioned to be provided to air carriers is known as "free-flight". In order for the air carriers to make use of that increased freedom, they will require a tool which provides an efficient flow of information in order to accomplish the necessary monitoring and control functions associated with each operator's control of its fleet. The present invention accesses Federal Aviation Administration data sources and other data sources, adds value to that data utilizing a trajectory modeling processor and a time-oriented display to provide users with improved management of their fleet.

Using periodic position reports and proposed departure times available through an enhanced traffic management system, airline data feed, and airport status information, such as runway capacity and configuration, the system of the instant invention constantly projects ahead in time and creates a future view of the expected arrival demand at the subject airport. The unique display of the instant invention gives the user a situational awareness of the "peaks and valleys" of the arrival demand, as these develop. The user is then able to intervene by speed control recommendations to pilots and by altering the scheduled takeoff time for close-in, short-hop flights. Associated with each airborne flight of the fleet, the instant inventive display provides a "speed controllability window". This "window" is a visual depiction of the range of the earliest to the latest airport arrival times feasible for the particular equipment type, considering the altitude and remaining distance to the destination. The "window" represents the time span in which arrival can be varied, using only speed adjustments while in the cruise phase of the flight. The user can thus see at a glance which flights are best candidates for manipulation, to effect a particular fleet arrival strategy.

Where the speed adjustment is sufficiently large, the flight deck would request air traffic controller approval to make the desired change. However, no procedural changes for air traffic controllers are required. It may be expected that most speed adjustments will take place between 90 minutes and 30 minutes from the current, since prior to 90 minutes from the current time there would be so much remaining exposure to random effects that an estimated time of arrival would not be very accurate. Less than 30 minutes from the current time is most likely too late, since there is too little time remaining for a speed change alone to have enough influence on the estimated time of arrival. The 30 and 90 minute time parameters are illustrative and may be varied.

In an actual test of the instant invention at the hub of an air carrier having a high volume of nighttime arrivals, the system clearly showed its value. On a particular evening, low ceiling and visibility significantly lowered the arrival acceptance rate at the airport. Under ordinary circumstances, the normal level of that carrier's air traffic would have stacked up a significant portion of the fleet in the air space above the airport. Utilizing the instant invention, it was possible to delay a sufficient number of departures of close-in flights to significantly reduce the number of aircraft which had to be put into holding patterns, thereby significantly improving the arrival flow at the airport, and increasing the air carrier's operational efficiency, as seen by reduced fuel costs.

SUMMARY OF THE INVENTION

Figure 1:
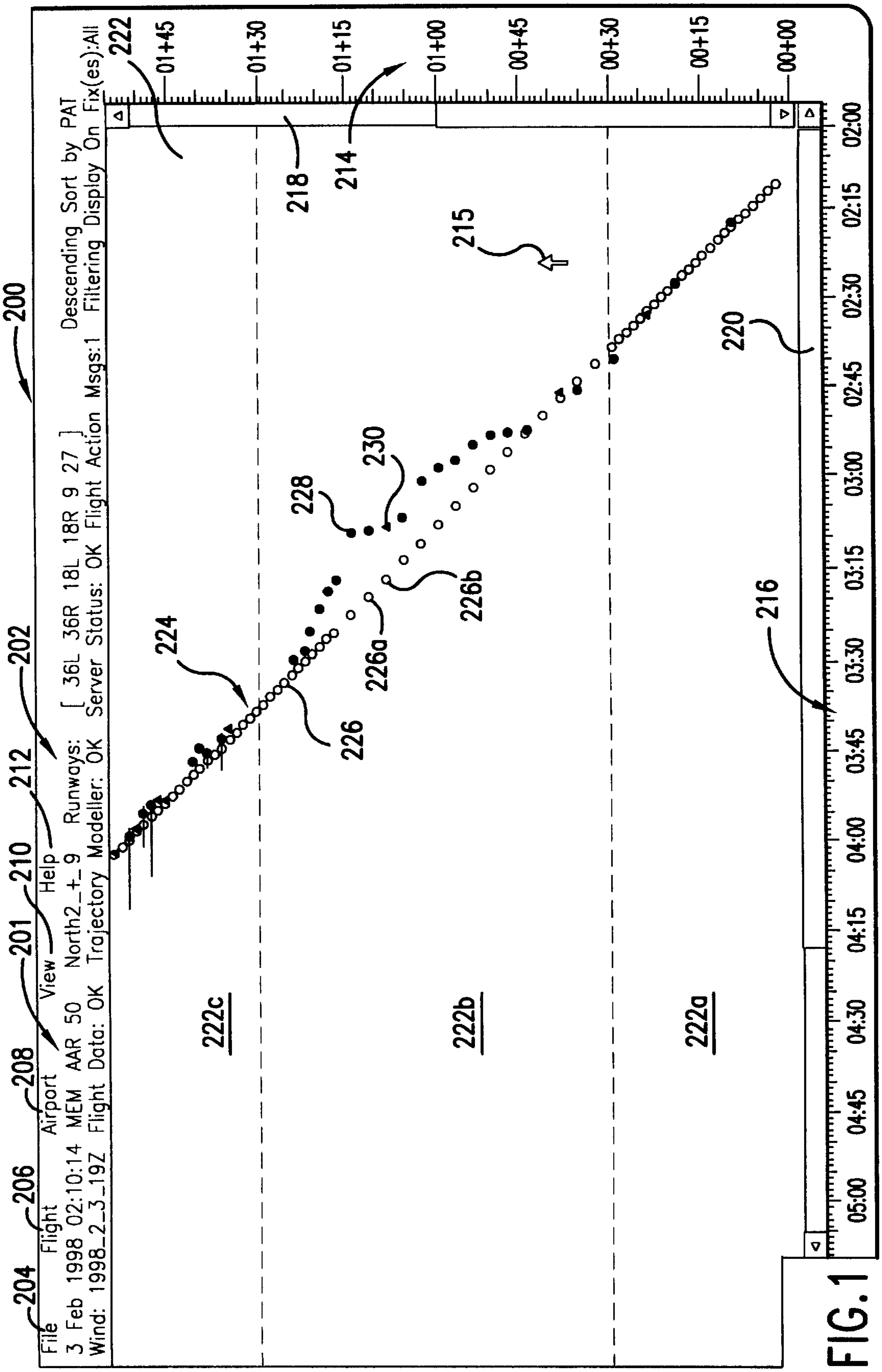
FIG. 1 is an illustration of the graphical display of the present invention.

A method for temporally displaying arrival management information for a particular terminal having a multiplicity of arrival time slots to which at least a portion thereof are assigned to particular vehicles. The method includes the step of providing a display device and a processor in communication with a transportation database. Further, the method includes forming a two-dimensional graphic representation of the multiplicity of arrival time slots. The two-dimensional graphic representation has an estimated arrival time coordinate and an assigned slot time coordinate and a multiplicity of first symbols positioned thereon to respectively represent the multiplicity of arrival time slots. The method includes the step of identifying which of the multiplicity of arrival time slots have vehicles assigned thereto and displaying identification indicia therefor adjacent respective ones of the multiplicity of first symbols. Further included is the step of obtaining vehicle data, including a latest potential estimated time-of-day of arrival, an expected estimated time-of-day of arrival, and an earliest estimated time-of-day of arrival for at least a portion of the assigned vehicles from the transportation database. Still further, the method includes the step of displaying a representation of an estimated time-of-day of arrival envelope for the portion of the assigned vehicles. The estimated time of arrival envelope representation includes an indication of the latest potential estimated time-of-day of arrival, the expected estimated time-of-day of arrival, and the earliest estimated time-of-day of arrival.

DESCRIPTION OF THE PREFERRED EMBODIMENT

Referring now to FIGS. 1–16, there is shown an air traffic management system and a method for displaying aircraft arrival management information. As will be seen in following paragraphs, the aircraft arrival management information and display 200 is specifically directed to the concept of presenting information so that an operator can quickly and efficiently assess a situation, such as delays due to congestion and respond effectively thereto. In particular, display 200 provides a display of time-based information of several system parameters, relates those parameters, over time, to various system resources, and presents that information to a human operator in a manner that complements the operator's mental model of the information required for the task. It should be understood that although the instant invention is exemplified in an aircraft application, it is applicable to other modes of transportation where large fleets of vehicles must be scheduled for arrival at a terminal having a limited capacity. Therefore, the instant invention may be used by bus lines, trucking companies, railroad and subway systems, cruise lines, maritime shipping lines, and the like.

Accordingly, a graphical representation of arrival time slots 224 available at a particular airport and the estimated time of arrival (ETA) envelopes 244 for arriving aircraft are presented in a visually intuitive manner. Users of display 200 are able to monitor and then subsequently exert control over the arrival sequence of aircraft by taking advantage of the individual flight flexibility presented on the display. The flight ETA envelope line end points 243, 245, when viewed in conjunction with the arrival slots 226 allows the human operator to visually determine whether or not a particular flight can be "fitted" to a particular slot. The human operator, by mentally projecting perpendicular lines from each end point 243, 245 of a flight ETA envelope 244, can readily determine the earliest and latest arrival slot 226 that a particular flight can meet. Conversely, if the operator decides to fill a specific arrival slot 226, the operator can visually project a vertical line through the arrival slot 226 and determine which flights would be eligible for that slot, by which flight ETA envelopes 244 are intersected by that mental vertical line. When the operator proceeds to assign a flight to an arrival slot, display 200 adds vertical lines 240 and 242, or 248, 250 and 252 to aid the operator during that procedure.

Figure 16:
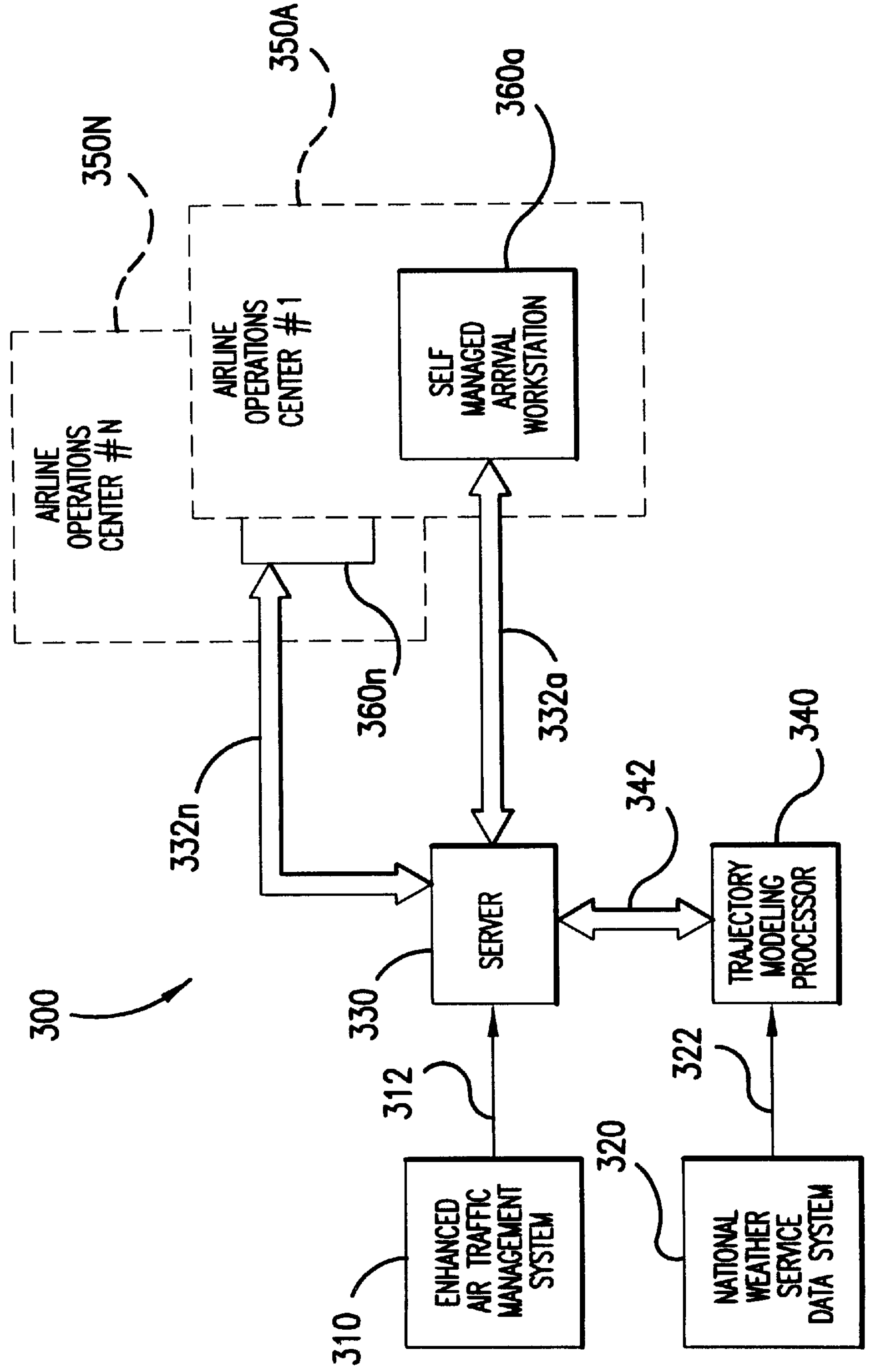

Referring to FIG. 16, there is shown, a Block Diagram of air traffic management system 300. Air traffic management system 300 makes possible an increased freedom of flight scheduling, routing and maneuvering of aircraft under control of the airline operators, as opposed to the more traditional control by Government air traffic management. Key to the ability of airline operators to provide such control, is the type of display provided from the self-managed arrival work station 360*a* of a given airline operations center 350A. In order to provide the display on work station 360*a*, particular information has to be obtained and processed relative to each aircraft flight scheduled for arrival at a particular airport. Aircraft and flight data is provided from the Enhanced Air Traffic Management System 310 through a data link 312 to a processor 330 which serves as a server for one or more airline operation centers 350A–350N through bidirectional data links 332*a*–332*n*, which provide data to the respective self-managed arrival work stations 360*a*–360*n*. The Enhanced Air Traffic Management System 310 is currently maintained at a Government facility and provides an output of nationwide data that includes aircraft type, flight plans, amendment to flight plans, track reports, arrivals, departures, and hand-off information. That data is fed to the server 330 for the airport of interest, as well as being provided to other like servers at other air carrier hubs. The server 330 may provide data to workstations at multiple airports. Information such as aircraft type, flight plans and track reports are sent from the server 330 to a trajectory modeling processor 340 through a bidirectional data link 342. The trajectory modeling processor 340 receives data on winds from the National Weather Service data system 320 through a data link 322. The trajectory modeling processor 340 calculates the trajectory and ETA information for each arriving flight and transmits such to server 330 through the data link 342. Alternatively, the functions of trajectory modeling processor can be carried out by a software module in the server 330, with the server receiving wind data through link 342. Server 330 communicates with one or more self-managed arrival work stations 360*a*–360*n* through respective bidirectional data links 332*a*–332*n*. A portion of the flight information and calculated ETAs are communicated to the work stations 360*a*–360*n*, whereas preferred arrival time data and flight modification data is fed back from the respective work stations to the server, the data being passed through to the trajectory modeling processor 340 for any necessary recalculations and update of ETAs, etc.

Referring now to FIG. 1, there is shown, work station display 200 which is in a "WINDOWS" type format, with a menu selection area 201 having menu selections 204, 206, 208, 210 and 212. Below the menu selection area 201, there is an upper status area 202 which provides pertinent information to the operator as to the status of the airport and air traffic management system 300. The temporal display of flight arrival information is provided in a display area 222, the display area 222 is bounded on one side by a vertically directed scale 214 which represents a relative time scale for an assigned slot time coordinate, wherein the origin, lowest vertical position, is the current time and therefore equal to zero. Display 200 also includes a vertical scroll bar 218, allowing the user to position the cursor 215 thereon and relocate the display window, move the display to show future arrival times outside the currently displayed parameters, and then back again. Use of the scroll bars 218 and 220 in combination with such cursor control devices as a mouse, track ball, joystick, and the like are well known in the art and not described in any further detail herein. Horizontally, display 200 includes a horizontal scroll bar 220 and a horizontally arrayed time scale 216 representing the time of day (Greenwich Mean Time) for an estimated arrival time coordinate, with the current time being at the origin. Thus, unlike the relative time scale where the origin is always 0 hours, 0 minutes and 0 seconds, the origin for the actual time scale continually changes to read the actual current time-of-day (GMT). The location of the original of each time scale 214, 216 can be shifted to an opposing end of each respective time scale, and/or the two time scales interposed, all without departing from the inventive concept disclosed herein.

Within the arrival slot display area 222, there is a graphical representation of arrival slots 224. The graphical representation of arrival slots is defined by a linear array of open circles 226, each defining an idealized arrival slot. The linear array which defines the graphical representation of arrival slots 224, slopes at 45° where the scaling of relative time and actual time are equal. Obviously, if one or the other of the time scales are expanded or contracted, independent of the other, the angle of the graphical representation of arrival slots 224 will shift accordingly.

As will be described in following paragraphs, generation of the graphical representation of the arrival slots is a function of the arrival acceptance rate at the airport of interest. That arrival acceptance rate will be a function of the number of available runways, weather conditions, and exigencies which affect the availability of runways. As such factors are variable, the acceptance rate can change during the course of a day. Such a change in acceptance rate is illustrated in FIG. 1, where the graphical representation of arrival slots 224 indicates a reduction in arrival rate beginning at 2:38 GMT (30 minutes from the current time on the relative time scale) to approximately 3:23 GMT (1 hour and 15 minutes from the current time on the relative time scale). Over that forty-five minute time span where the arrival rate is reduced, there are a fewer number of arrival slots 226, and therefore the spacing therebetween is increased, as illustrated by the distance between the arrival slot **226*a* and arrival slot 226*b***. While the above reduction in arrival acceptance rate is indicated as beginning 30 minutes from the current time, 30 minutes in the future, changes in arrival acceptance rate could be unplanned and occur unexpectedly, in which case such would begin at the indication of current time and extend therefrom when the display was updated. If such were a sudden change, the operator would then be able to exert control over scheduled arrivals to prevent landing delays from "snowballing". As will be described in following paragraphs, the operator can effect the arrival time of aircraft by delaying their departure from another airport, the most efficient means of executing a delay, request changes in speed of aircraft already in flight, change route, or change altitude.

The arrival slot display area 222 is further subdivided into three regions, a first region **222*a* extending horizontally across the display to define a band being illustrated as representing the next 30 minutes, the 30 minute time period prior to the current time-of-day. In a preferred embodiment, the display of self-managed arrival work station 360*a* is capable of at least gray scale presentation, and preferably display of a multiplicity of colors. The region 222*a* is then indicated by a particular background color or shading. The region which is within 30 minutes of the current time-of-day, as represented by the shaded or colored background in region 222*a*, indicates a time period which is likely to be too short to affect an aircraft's ETA through a speed change. Similarly, a boundary is illustrated at 1 hour and 30 minutes from the current time, defining a boundary for a region 222*c*, that is represented by a different shading or color from that of the region 222*a*. The region 222*c* illustrates a time period that is equal to or greater than 90 minutes from the current time-of-day. The region 222*c* represents a time period where the exposure to random effects is sufficiently long so as to reduce the accuracy of the ETC calculations. Between the regions 222*a* and 222*c*, there is a region 222*b* which is shaded or colored differently from both region 222*a* and region 222*b*, and indicates a time span where the ETA of airborne aircraft can more accurately be made. By the use of changes in background shading or color in the regions 222*a*, 222*b* and 222*c*, the operator's attention is easily focused to the portion of the display where control can accurately be exerted, without restricting the display to only that region, allowing the operator to visually ascertain air traffic conditions which will affect aircraft within the controllability window 222*b*, or will be affected by changes made within the controllability window 222*b***.

The menu selection 210 having the indicia "View" is made by a switch closure being made (mouse click) with the cursor positioned on the indicia of menu selection 210. The menu that appears to the user in response to "clicking" on "View" has selections such as "Zoom In", "Zoom Out", "Set Display Update Interval", "Data Display", and the like. The "Zoom In" and "Zoom Out" selections allow the user to change the time scaling for the display, to thereby enlarge a desired portion of the graphical representation of arrival slots 224 visible within the arrival slot display area 222. The "Data Display" selection activates a further pull-down menu of functions such as "Filter Display on Arrival Fix", "Same Color for Active and Proposed Flights", "Different Color for Active and Proposed Flights", "No Text", "Flight ID Only", "Flight Data", and "Arrival Fix Information". The "Filter Display on Arrival Fix" option, when selected, brings up a dialogue box that lets the operator filter the flights that are displayed, based on the Arrival Fix over which they are expected to approach the airport. An Arrival Fix is a position (longitude and latitude) over which an aircraft has been assigned to fly over on its approach into a particular airport. Each airport has a plurality of fixes pre-identified and known to pilots arriving thereat, with different aircraft being assigned to fly over different fixes on their approach into the airport. Thus, through use of this filter function, the operator can selectively view all of the scheduled arriving flight symbols 228, 230 which have been assigned to particular fixes. The functions "No Text", "Flight ID Only", "Flight Data", and "Arrival Fix Information" are selected on a mutually exclusive basis and define the information which is displayed alongside the symbology 228, 230 representing the scheduled arrival aircraft. The "Display Proposed Flights" is another filter function which allow the user to toggle between displaying and not displaying proposed flights, flights which have not yet departed, along with symbology of airborne flights. Particular symbols for arriving flights may also be hidden from view (filtered) by "double-clicking" on the particular symbol (moving the cursor over the symbol and actuating two consecutive switch closures on the cursor control device) to obtain the hide-from-view option. When it is desired to re-display those symbols which have been hidden, the operator "clicks" on the menu selection 206 ("Flight"). That menu includes a function, "Restore Hidden Flights", which returns the previously hidden symbols to the display when selected. The "Flight" menu selection also provides other options to allow the operator to obtain particular information about airborne and proposed flights.

Figure 2:
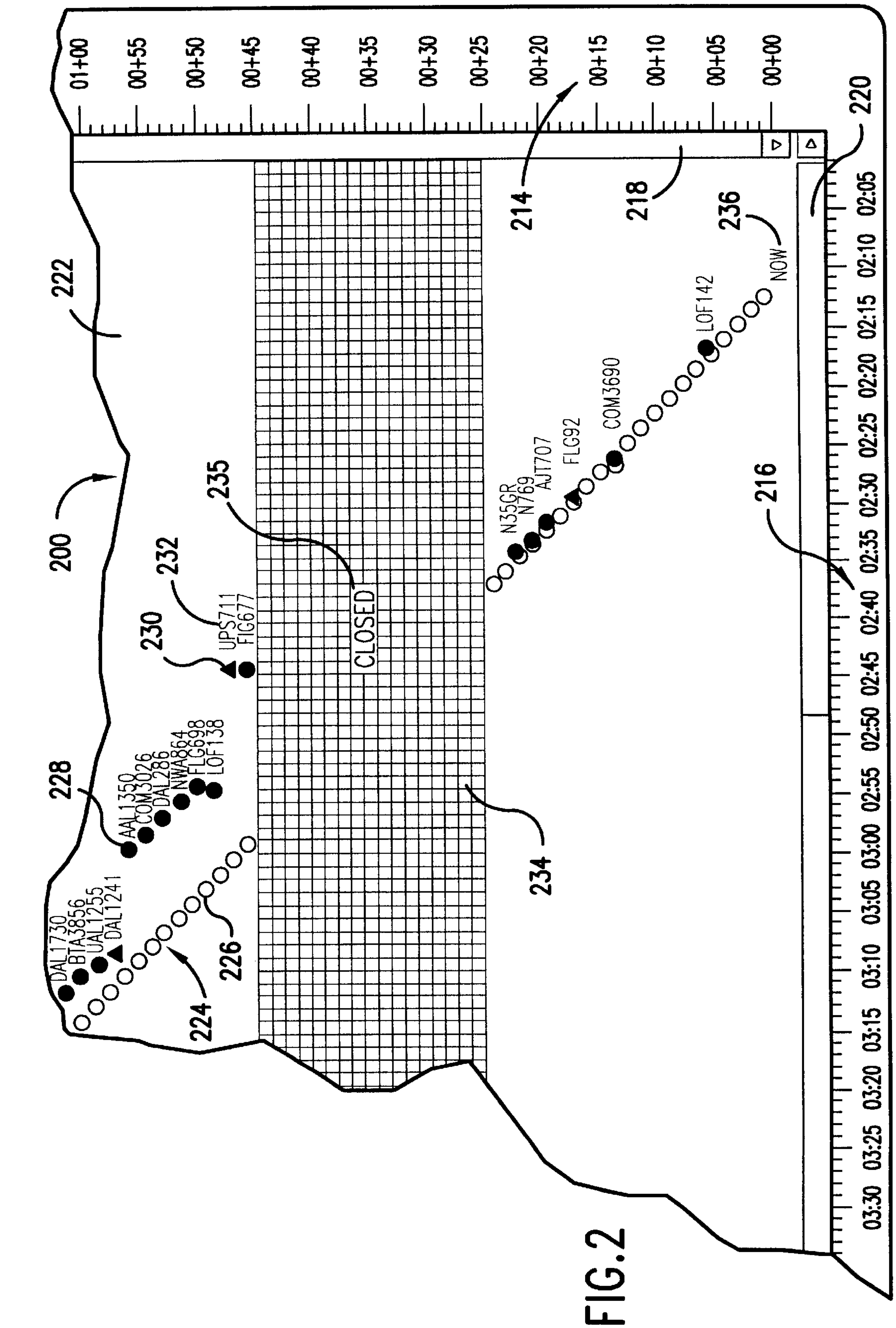
FIG. 2 is a partial view of an illustration of another aspect of the display of the present invention.

Referring to FIG. 2, display 200 shows the graphical representation of arrival slots 224 under conditions wherein there is a 20 minute closure of the airport of interest. The arrival slot display area 222 shows a "zoomed in" display where the origin (current time) is indicated with indicia 236, the word "NOW". As indicated, at 25 minutes from the current time the airport will close for a period of 20 minutes, reopening subsequent to a point in time which is 45 minutes from the current time. The closed airport indication 234 provides an interruption in the graphical representation of arrival slots 222, there being no arrival slot depictions 226 disposed within the depicted time span that the airport is closed. To further aid in visualization of the closed time span, the closed airport indication 234 is formed by horizontal and vertical lines, the color or shading of which may be different from the background of any portion 222*a*, 222*b*, 222*c* (shown in FIG. 1) of the arrival slot display area 222 and may include the indicia 235, the word "CLOSED". Obviously, the closed airport indication 234 may be in the form of a solid band of color or shading which is distinct from an adjacent background color of the display area 222, or include cross-hatch patterns alone that make it distinct.

The zoomed-in view of FIG. 2 also shows the flight identification indicia 232 that is associated with each Estimated Time of Arrival symbol 228, 230. As previously discussed, the user may select what information is to accompany the Estimated Time of Arrival symbol using the "View" menu selection 210. Thus, the indicia 232 may be eliminated, or consist of flight ID information, as shown, flight data, or arrival fix information. The Estimated Time of Arrival symbol 228 is distinguished from the Estimated Time of Arrival symbol 230 to further supply the user with additional information. The symbol 228 represents an aircraft which is in flight, whereas the symbol 230 represents an aircraft that is currently still on the ground. Thus, when the operator desires to alter the ETA of an aircraft, different actions will be required as a function of whether the aircraft is in the air, or still on the ground. For an aircraft in the air, it will be necessary to alter the speed of the aircraft in order to effect a change in the ETA, whereas an aircraft on the ground can delay its takeoff, or possibly be rescheduled for an earlier takeoff.

Figure 3:
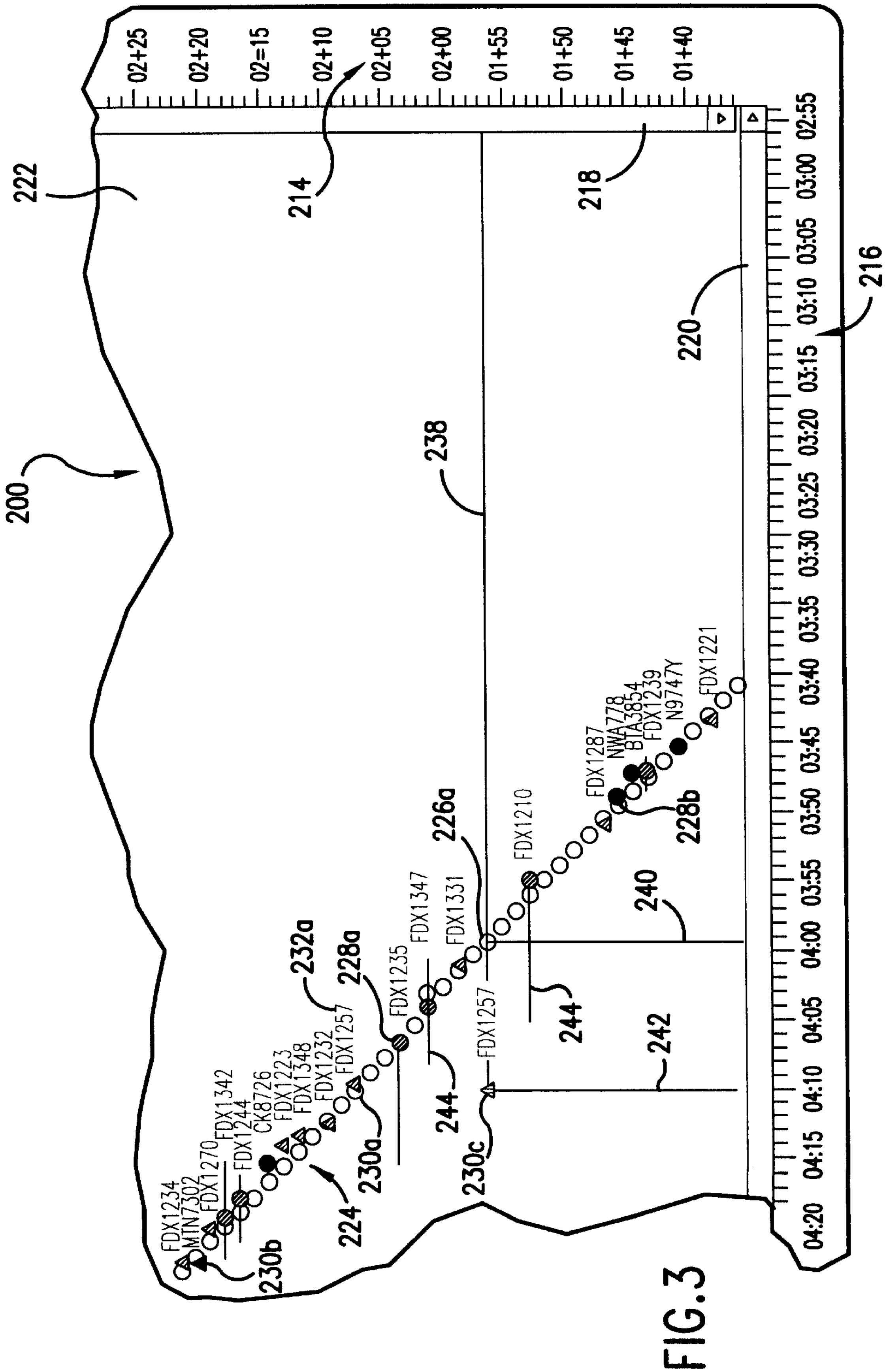
FIG. 3 is a partial view of an illustration of a further aspect of the display of the present invention.

When it is desired to alter the ETA of an aircraft, the operator of work station 360*a* (shown in the Block Diagram of FIG. 16) sets a Preferred Arrival Time (PAT) for the aircraft. To set a PAT, the operator moves the cursor of the display over the Estimated Time of Arrival symbol 228, 230 of the desired aircraft and "drags that symbol" vertically to place it in alignment with the desired idealized arrival slot 226*a*. Alternatively, the operator can "double click" on the symbol and then type in the preferred arrival time to be set. As shown in FIG. 3, the operator has dragged the symbol 230*a* representing the proposed flight of FDX1257, originally scheduled for arrival at 4:10 GMT, to the arrival slot 226*a* with an arrival time approximating 3:59 GMT. When the operator "clicks" on the symbol 230*a* to "drag" it, a horizontal lead line 238 is generated which extends from the dragged symbol 230*c* to the far side of the arrival slot display area 222, adjacent the relative time scale display 214. The horizontal lead line 238 makes it easier for the operator to see the relative time of the PAT being selected. Additionally, a vertical lead line 242 is generated to extend from the dragged symbol 230*c* vertically downward to the bottom edge of the arrival slot display area 222, adjacent the actual time scale display 216. As the symbol 230*c* is vertically aligned with the original symbol 230*a*, which still remains on the display, such provides a clear indication of the originally proposed arrival time. A second vertical lead line 240 is also generated to extend from the arrival slot symbol 226*a* intersected by the horizontal lead line 238 to the bottom edge of the arrival slot display area 222, adjacent the actual time scale display 216. The vertical lead line 240 indicates to the operator the preferred arrival time being set. In the example shown, the PAT being set changes the arrival time for Flight FDX1257 to a time which is approximately 11 minutes earlier than previously proposed, requiring Flight FDX1257 to either take off earlier than previously scheduled, or make adjustments in its flying speed subsequent to becoming airborne to meet the new arrival time. When the user has confirmed the Preferred Arrival Time for Flight FDX1257, either by ending the dragging operation (opening the cursor positioning device switch closure) or appropriately responding to a dialogue box (not shown) which opens in response to the dragging operation, the original symbol 230*a* and flight identification indicia 232*a* are removed from display 222, as is horizontal lead line 238 and the vertical lead lines 242 and 240. When the PAT is confirmed, the symbol 230*c* is also displaced horizontally to be adjacent the arrival slot symbol 226*a*, which will then be filled by an appropriate color or shading to distinguish it from other filled symbols. PATs can be canceled, by "double clicking" on the flight symbol or flight ID to obtain the cancel PAT option. All PATs can be canceled using the flight menu selection 206.

In addition to distinguishing arrival slots for which a PAT has been set, and distinguishing airborne flights from proposed flights (aircraft in the air versus aircraft on the ground), display 222 provides different colors or shading for symbols representing the user's own aircraft versus those of other air carriers. For instance, the proposed flight symbol 230*a* may be shaded or colored differently from the symbols representing aircraft of other carriers, and in one working embodiment have been colored a light green. Alternatively, the symbols for aircraft of other carriers can be distinguished by the shape of the symbol rather than the color or shading thereof. The proposed flight symbols 230*b* of other carriers are filled in solidly, and on a color display may be of a color that is easily distinguishable from that used for the symbols 230*a*. Similarly, the symbols 228*a* for the user's aircraft are filled in with a color or shading which is distinguishable from the symbols 228*b* representing aircraft of other air carriers. As the arrival times of the user's own aircraft are the only aircraft which can be controlled from work station 360*a*, it is important that the user be able to readily distinguish the symbols 228*a*, 230*a* from the symbols 228*b*, 230*b*. However, the particular method used to accomplish that distinguishment is not important to the inventive concepts disclosed herein.

Figure 4:
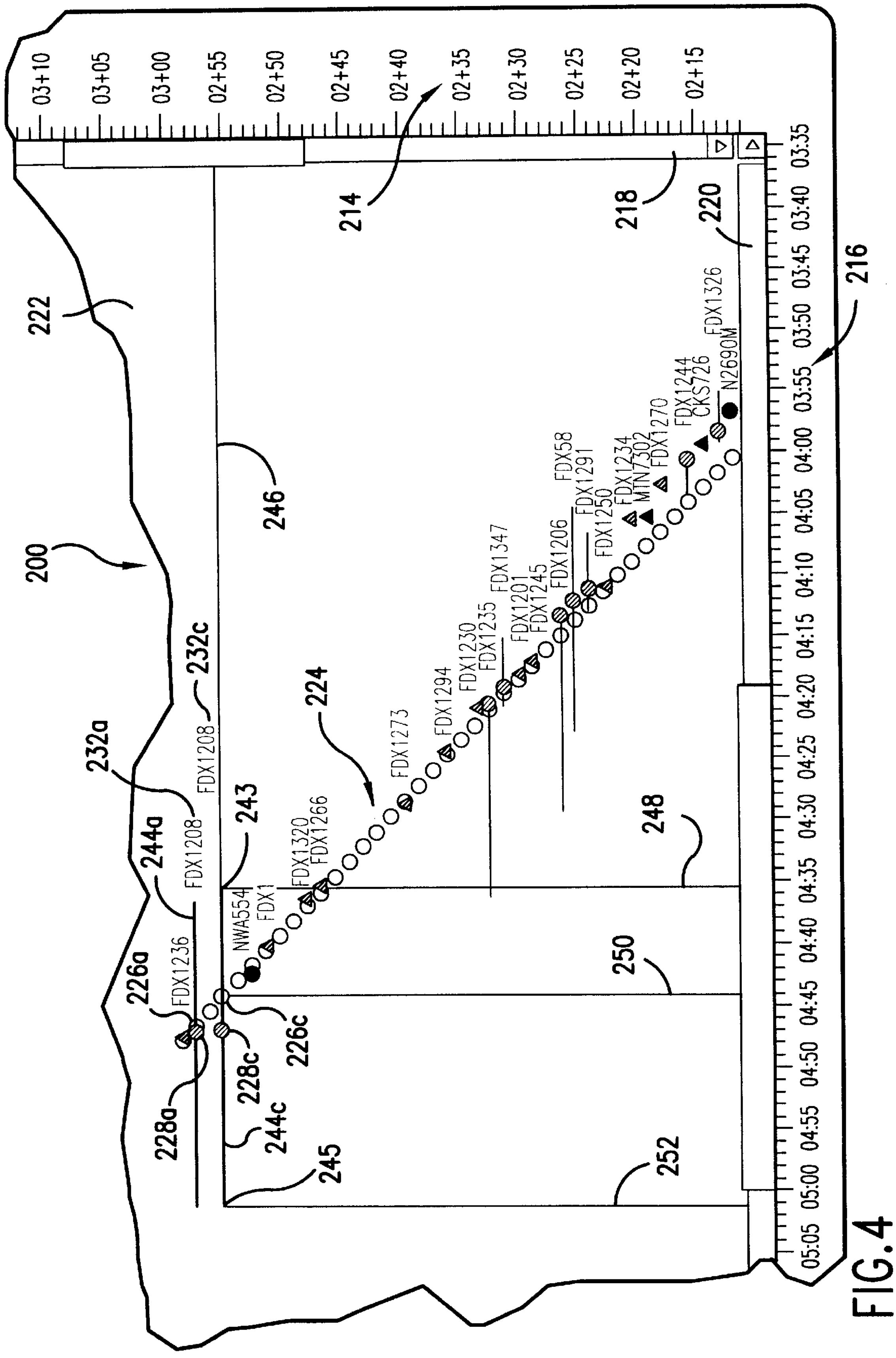
FIG. 4 is a partial view of an illustration of yet another aspect of the present invention.

Another distinguishing feature of the symbology for the user's own aircraft which is in flight is the inclusion of an ETA envelope 244 which extends horizontally to indicate the earliest and latest estimated arrival times (GMT) for each of the user's aircraft that is in flight. As is illustrated in FIG. 4, the setting of a PAT for an aircraft in flight is much like that for a proposed flight. To set a PAT, the operator has "clicked" on the symbol 228*a* and dragged it from the arrival slot 226*a* to the arrival slot 226*c*. As shown, accompanying the estimated time of arrival symbol 228*a* there is an ETA envelope 244*a* that indicates the earliest and latest possible ETA for the particular aircraft, and flight identification indicia 232*c* indicating the aircraft is Flight "FDX1208".

The dragged symbology includes an Estimated Time of Arrival symbol for the aircraft 228*c*, located horizontally at the same time of day as the symbol 228*a*, an ETA envelope 244*c* indicating the same maximum and minimum ETAs as the envelope 244*a*, and flight identification indicia 232*c* which is identical to that of the indicia 232*a*. Subsequent to the operator confirming the selected PAT, the original symbol 228*a*, ETA envelope 244*a* and indicia 232*a* will be removed from the display. When a PAT is being selected for an aircraft in flight, a horizontal lead line 246 extends from the arrival time slot 226*c* to the side of the display area 222, adjacent the relative time scale 214. Three vertical lead lines 248, 250 and 252 are generated to extend to the bottom of the display area 222 adjacent the actual time scale 216. Vertical lead line 248 extends from the end point 243 of the ETA envelope 244c, representing the earliest possible ETA, while lead line 252 extends from end point 245 of ETA envelope 244c, representing the latest possible ETA for Flight FDX1208. Lead line 250 extends from the arrival slot 226*c*, representing an idealized arrival time, a time which coincides with the arrival slot at the designated airport.

The Estimated Arrival Time represented by the symbol 228*c* is located horizontally with respect to the arrival slot 226*c* based on the flight information provided from the enhanced air traffic management system 310, shown in FIG. 16, and processed by the trajectory modeling processor 340. Accordingly, it may be necessary for Flight FDX1208 to increase speed in order to bring its estimated ETA into correspondence with the preferred arrival slot. As that flight is more than 2 hours and 55 minutes from arrival, there are many variables which can affect the aircraft's ETA, and thus it is too soon for the pilot to accurately know the effect of any changes to the flight's ETA.

Figure 5:
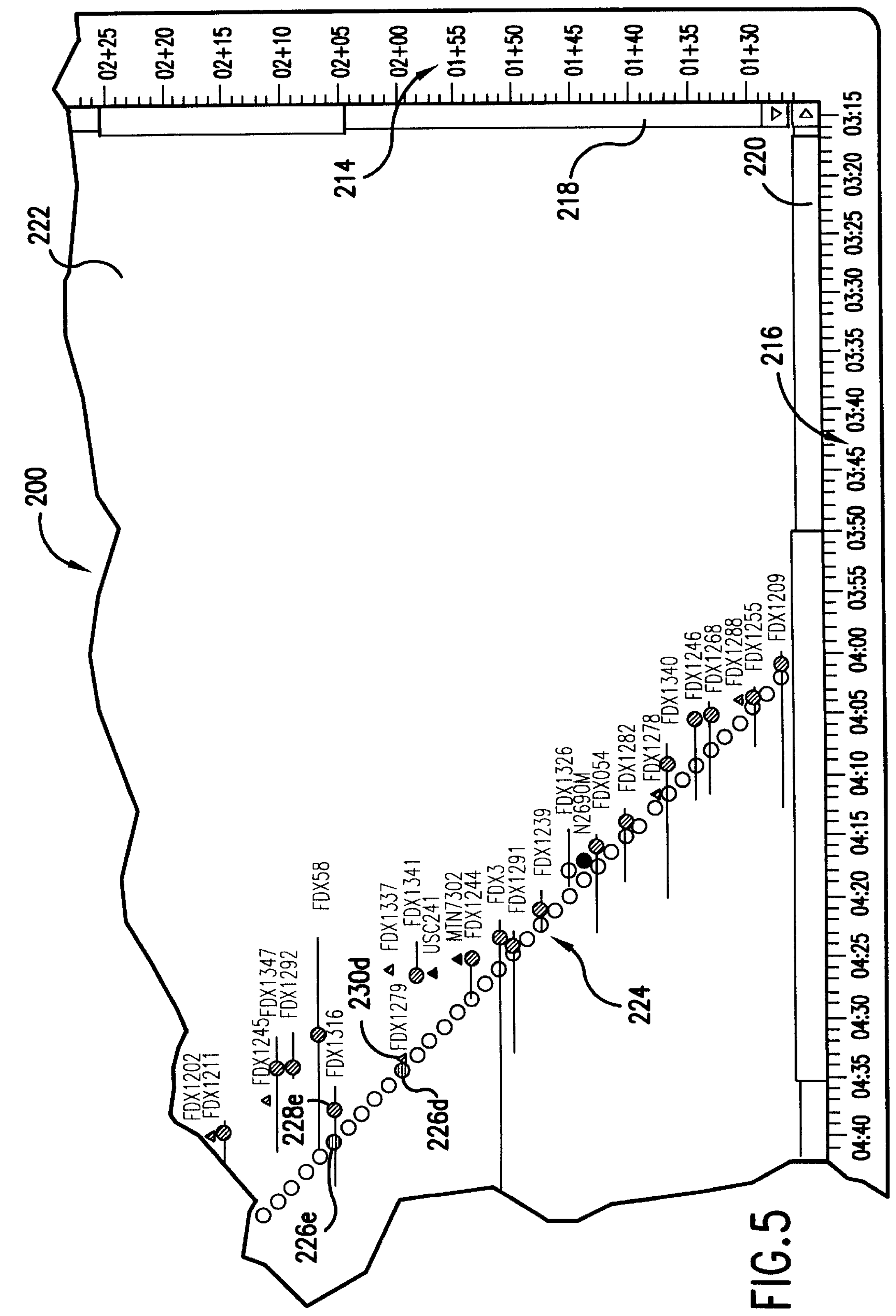
FIG. 5 is a partial view of an illustration of another aspect of the present invention.

Turning now to FIG. 5, there is shown an example of display 200 wherein Preferred Arrival Times have been set for two aircraft, an aircraft in flight (FDX1316) and a proposed flight (FDX1279). Thus, when the Preferred Arrival Times have been set, each of the arrival slot symbols 226*d* and 226*e* are filled in with a distinguishing color or shading to indicate that the arrival slot has been filled by a flight that has been designated as having a priority. In the case of arrival slot 226*e*, such is the preferred arrival slot for Flight FDX1316 which is depicted as having an Estimated Arrival Time approximately *3* minutes earlier, as indicated by the position of the Estimated Time of Arrival symbol 228*e* than the arrival slot indication 226*e*. Arrival slot symbol 226*d* indicates the PAT for the proposed Flight FDX1279. Adjacent the symbol 226*d*, and partially overlaid thereby is the Estimated Time of Arrival symbol 230*d* for proposed Flight FDX1279. As the Preferred Arrival Times have been set for both flights, the display no longer includes any lead lines or symbols representing the flights' previous arrival slot assignment.

Thus, the graphical display provided utilizes one symbol 226 to indicate available arrival slots, horizontal lines to indicate the arrival time flexibility of each flight (earliest and latest arrival time at an airport based purely upon air speed changes). Obviously, the arrival time flexibility changes as the aircraft gets closer to the airport and therefore the length of the horizontal line 244 changes accordingly. The filled or shaded symbols on the horizontal line indicates the flight's nominal or currently estimated ETA, based upon current position, observed air speed, and other factors, all of which are dynamically updated. The end points 243, 245 represent the range of possible ETAs for the flight based on the type aircraft, its altitude and the range of flying speed that is therefore possible for that aircraft. When the ends 243, 245 of the ETA envelope 244 are visually projected to the graphical representation of arrival slots (the diagonal line made by the sequential arrangement of arrival slot symbols 226), such indicates the full range of flexibility in assigning a particular arrival slot as a PAT at the airport of interest. The user can then utilize the display to make decisions about aircraft arrival scheduling in order to optimize air traffic flow and/or arrival slot demand at a particular airport. Obviously, the scheme outlined herein for managing air traffic is applicable to other modes of transportation, wherein limited terminal resources must be shared by a greater number of vehicles and a vehicle traffic management system provides data about vehicles that are in transit.

Figure 6:
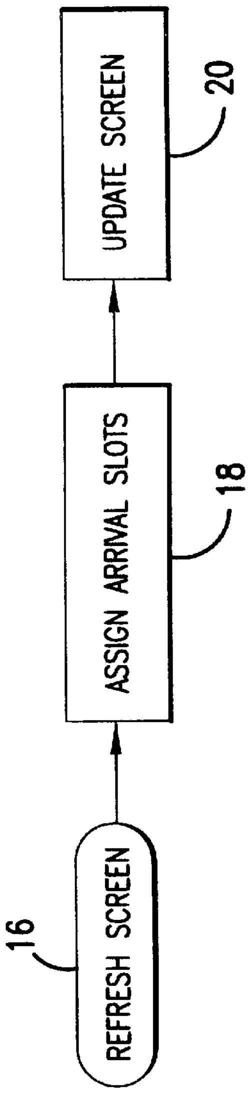
FIG. 6 is a flow chart of a slot manager routine of the present invention.

As the unique display outlined above is generated by software, and such runs on the various processors described in FIG. 16, it is believed beneficial to review the flow charts which describe the operation of such software in order to have a better understanding of how the display and symbology are located in the arrival slot display area 222. Turning to FIG. 6, there is shown a flow chart broadly representing a slot managing routine of the display generating software. In Block 16, it is determined whether the screen needs to be refreshed. The screen is refreshed on a periodic basis, as well as whenever there is a change in data. The data may change based on actions of the user (selecting a menu and changing a parameter, dragging a symbol, etc.). Further, the screen would require refreshing whenever the data that was transmitted over the network from the enhanced air traffic management system 310 changed. From Block 16, the flow passes to Block 18 wherein an arrival slot selection routine, to be described further in following paragraphs, is carried out. From Block 18, the Block flows to Block 20 wherein the work station screen display is updated.

Figure 7:
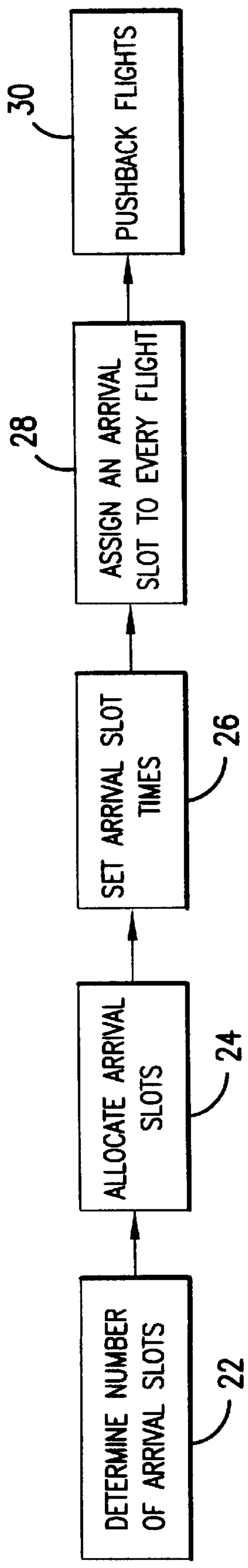
FIG. 7 is a flow chart of an arrival slot assignment routine of the present invention.
Figure 8:
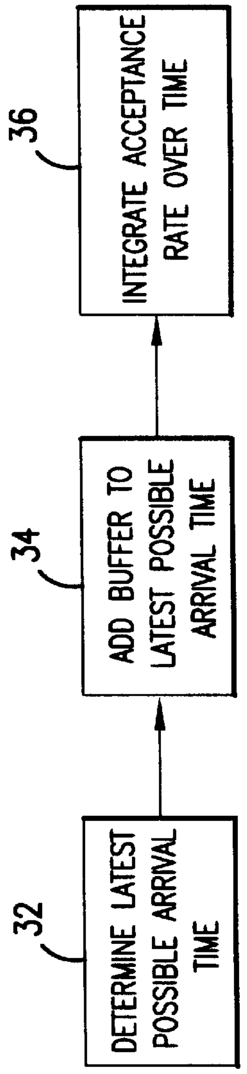
FIG. 8 is a flow chart of a routine for determining the number of arrival slots of the present invention.

The steps required for assignment of the arrival slots are detailed further in FIG. 7. First, in Block 22, the number of arrival slots is determined. The process for determining the number of arrival slots will be described subsequently in more detail when FIG. 8 is discussed. Subsequent to the determination of the number of arrival slots, flow passes to Block 24, wherein memory is set aside for assignments of the arrival slots and other housekeeping chores, such as the initialization of certain data structures. From Block 24, the flow passes to Block 26. In Block 26, the beginning and end times of each of the slots is determined. From there, the flow passes to Block 28 wherein every flight, proposed or airborne, is assigned to a slot. At this point in the flow, there may be more than one flight assigned to any one slot, however, such is resolved in the next step. Next, the flow passes to Block 30, wherein any conflict for arrival slots is resolved.

When more than one flight is assigned to the same arrival slot, the flight which is most well suited for the arrival slot maintains its position in the queue, while the other flights which have been assigned to that slot are pushed back to subsequent arrival slots. The basis for determining what flight is most well suited for an arrival slot has been predetermined and includes such factors as whether a PAT has been assigned to one of the flights, how much time remains before arrival, etc.

The process for determining the number of arrival slots, Block 22, is further broken down in FIG. 8. The first step, Block 32, determines the latest possible arrival time for each flight. For each flight, the ETA, the latest possible ETA and any Preferred Arrival Time of the flight is examined to determine the latest possible arrival time. From Block 32, the flow passes to Block 34 wherein a buffer time is added to the latest possible arrival time. The amount of buffer time may be a constant, such as a 10 minute time period, or a variable which varies as a function of the time into the future that the arrival will occur. Subsequent to the buffer time being incorporated into the latest possible arrival time in Block 34, the flow passes to Block 36 wherein the acceptance rate of the particular airport is integrated over time to yield the number of arrival slots for the particular increment of time.

Figure 10:
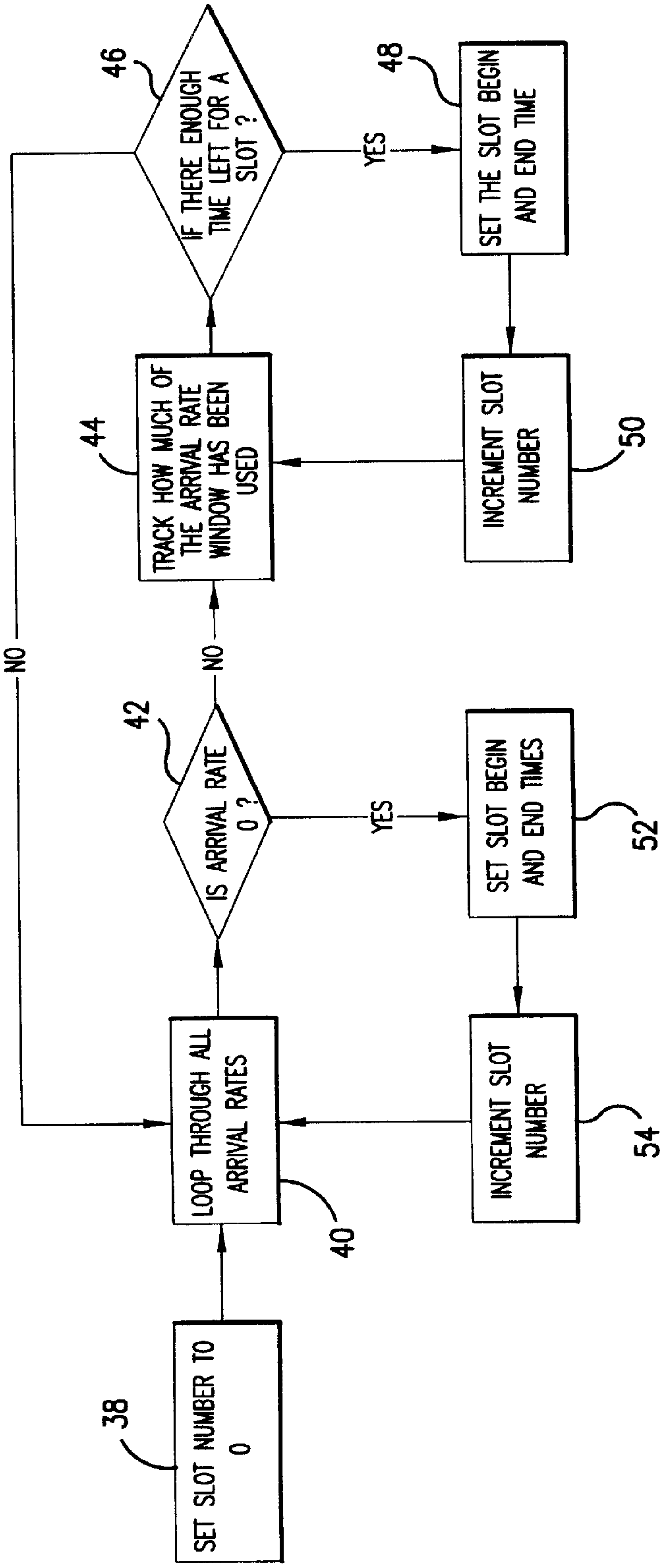
FIG. 10 is a flow chart for a routine for setting the arrival slot times of the present invention.

The steps involved in setting the arrival slot times, Block 26, are further delineated in FIG. 10. In Block 38, the variable, slot number, is set to 0, as slot 0 is the first slot which is examined by the routine. Then, flow is passed to Block 40. In Block 40, the arrival rates over time are examined. The arrival rate may vary over time as a function of changes in weather conditions, scheduled and unscheduled maintenance, or emergency conditions. Next, the flow passes to the test block 42 where it is determined whether the arrival rate is 0. If the arrival rate is not 0, flow passes to Block 44 wherein it is determined how much of the arrival rate window has been used. Thus, if the arrival rate that has been calculated is valid for 60 minutes and the first slot which has been assigned occupies 2 minutes worth of time, then there would still be 58 minutes worth of arrival rate window in which to assign to other flights. From Block 44 the flow passes to the test Block 46 wherein it is determined whether there is sufficient time left for a full slot. If there is not enough time left, the flow passes back to Block 40 to begin the calculations for the next arrival rate. If, on the other hand, there is sufficient time left for a full slot, the flow passes to Block 48 wherein the slot begin and end times are set. From Block 48, the flow passes to Block 50, wherein the slot number is incremented and flow passes back to Block 44. Referring back to test Block 42, if the arrival rate was found to be 0 (airport closed), the flow then would pass to Block 52. In Block 52, the slot beginning and end times are set and the flow passes to Block 54 wherein the slot number is incremented. From Block 54, the flow would pass back to Block 40 for incrementing to the next arrival rate.

Figure 11:
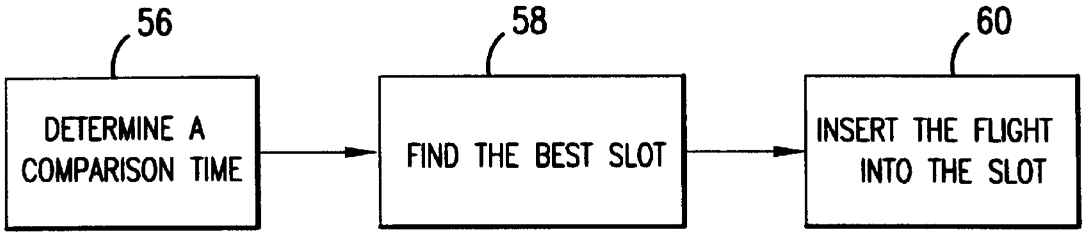
FIG. 11 is a flow chart for a routine for assigning arrival slots to flights of the present invention.

The steps involved in assigning an arrival slot to every flight, Block 28, is further detailed in FIG. 11. Beginning in Block 56, a comparison time is determined. The comparison time is either the Preferred Arrival Time, if such is set, or the ETA of the flight. From there, flow passes to Block 58, wherein the best slot for each flight is chosen. The best slot is chosen by using the comparison time and the slot's beginning and end times. From Block 58, the flow passes to Block 60, wherein the particular flights are inserted into the slot identified in Block 58 as being the best for the flight. This procedure allows more than one flight to be assigned to the same slot, and as previously discussed, such contention for arrival slots must be resolved.

Figure 12:
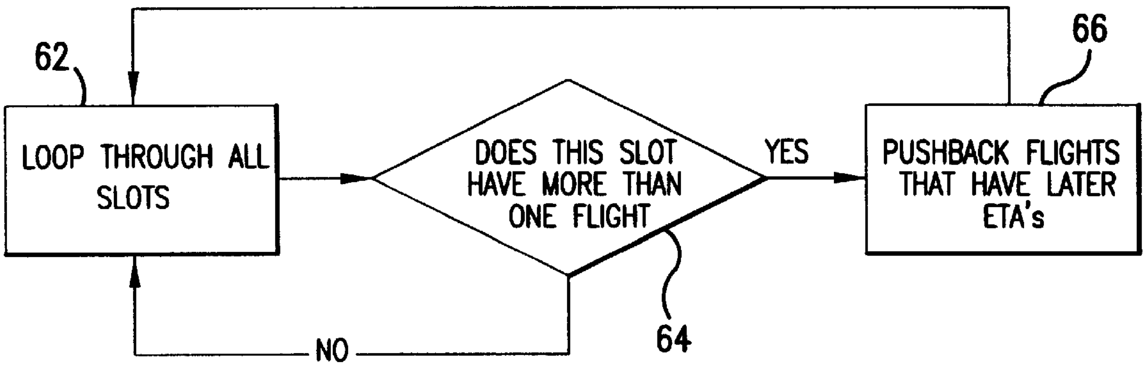
FIG. 12 is a flow chart for a routine for limiting arrival slots of the present invention to no more than one flight.
Figure 13:
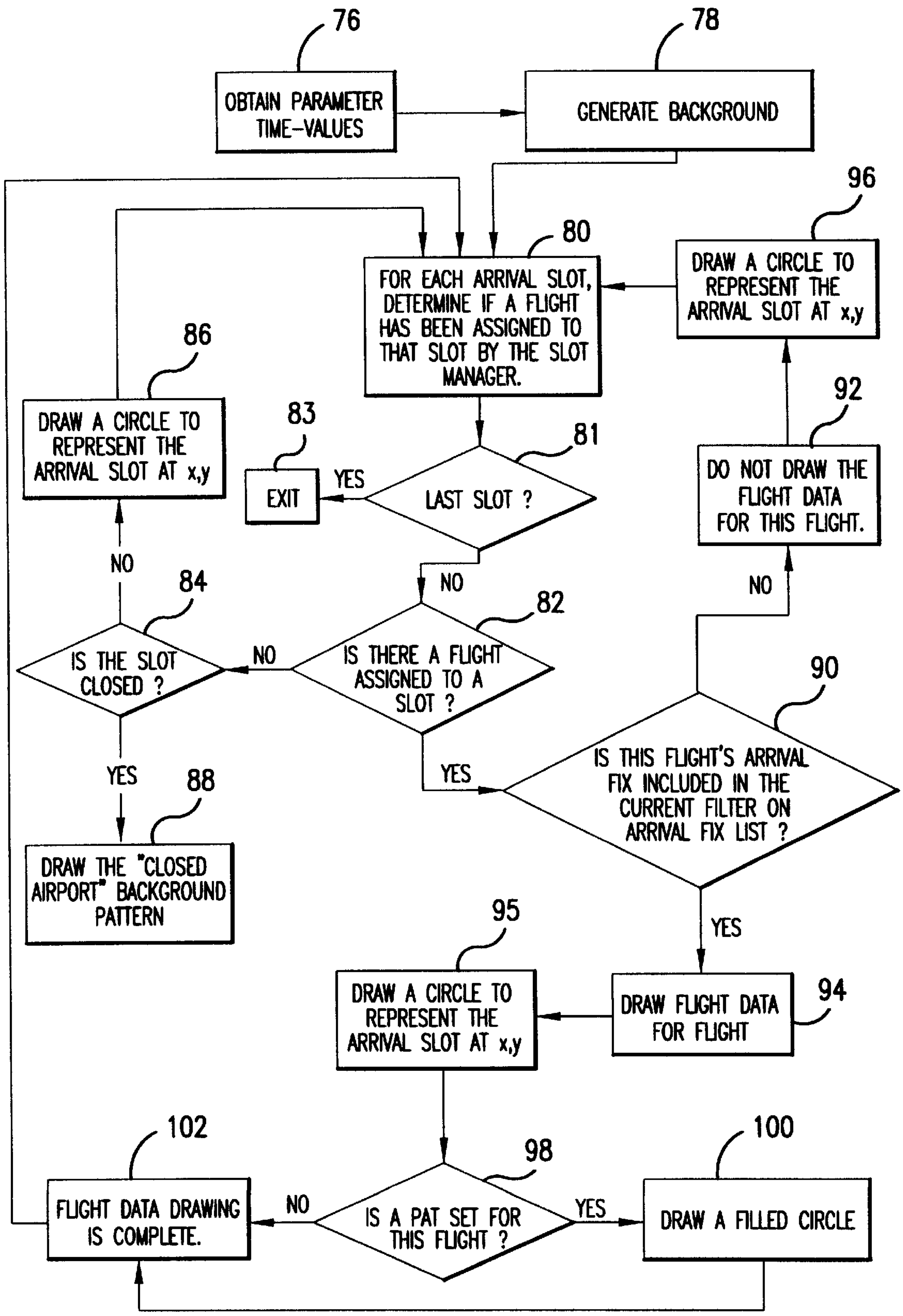
FIG. 13 is a flow chart for a routine for generating the display of the present invention.

The resolution of any conflicts for arrival slots, Block 30, is further defined in FIG. 12. Block 62 begins an incremental loop through each of the slots. From Block 62, the flow passes to test Block 64, wherein it is determined whether more than one flight has been assigned to a slot. If more than one flight has not been assigned, then flow passes back to Block 62 to increment to the next slot. If, on the other hand, more than one flight has been assigned to a slot, flow passes to Block 66. In Block 66, priority is given to flights to which Preferred Arrival Times have been assigned. Flights which have later ETAs are pushed back to later slots. Subsequent to completing the push-back procedure, flow passes from Block 66 back to Block 62 to continue looking at the remaining slots.

Figure 9:
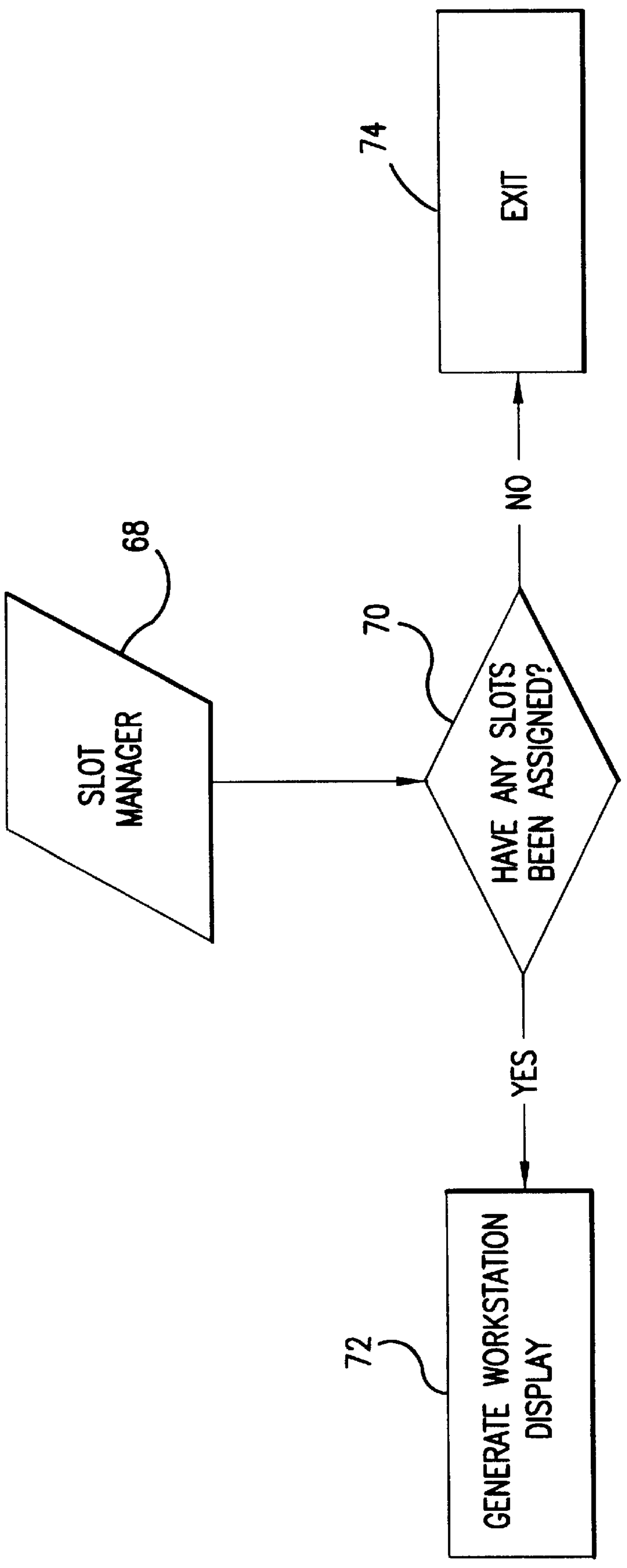
FIG. 9 is a flow chart for the drawing of the display of the present invention.

The assignment of arrival slots, broadly presented in FIG. 6, represents the slot manager module of the display generation software, now represented by Block 68 in FIG. 9. From the slot management functions, flow then passes to the test Block 70 wherein it is determined whether the slots have been assigned. If they have not been assigned, flow passes to Block 74, wherein the routine is exited, and will subsequently reinitiate with operation of the slot manager routine. If slots have been assigned, flow passes from Block 70 to Block 72, wherein the work station display generation routines are carried out, as will be described in following paragraphs.

The generation of the display 200 begins with Block 76, wherein there are certain parameters and certain time restrictions, such as relative times which establish upper and lower limits for setting of Preferred Arrival Times. From Block 76, flow passes to Block 78, wherein the divided background is created, establishing the arrival slot display areas 222*a*, 222*b*, and 222*c*, as previously described. By dividing the display area 222 into three distinct areas, as indicated by three distinct colors in the background, or different shading thereof, the operator can easily identify the time span for which control of aircraft in flight can more accurately be made to effect the ETA thereof. For each arrival slot, there may not be a flight to fill that slot, so the flow passes from Block 78 to Block 80, wherein it is determined, for each arrival slot, whether a flight has been assigned thereto. From Block 80, the flow passes to test Block 81, wherein it is determined whether the last slot has been processed. If the last slot had been processed, then flow passes to the exit Block 83 and then eventually back to the slot manager routine for repeating the process responsive to an update of data or passage of a predetermined amount of time. If the last slot has not been processed, flow passes to test Block 82, wherein it is determined whether a flight has been assigned to the slot. If a flight has not been assigned to the slot, flow then passes to the test Block 84 to determine whether or not the slot occurs during a period when the airport is closed. If not, flow passes to Block 86 wherein the symbol is drawn on the display at the appropriate time coordinates. For one working embodiment, the slot symbol is an open circle which is located at the appropriate X (estimated arrival time) and Y (assigned slot time) coordinates. Where the slot is closed, flow passes from Block 84 to Block 88, and the "closed airport" background pattern is drawn, as has been previously described.

If a flight has been assigned to the slot, then flow from Block 82 passes to test Block 90 wherein it is determined whether the flight's arrival fix is included in the current filter list. As previously described, the operator can limit the display to particular groupings of aircraft, wherein the arrival fix is a very common filter parameter. Obviously, any filter parameter may be utilized in this step to minimize the clutter of flight symbols on the user's display. If a flight's characteristics (such as arrival fix) do not match the filter criteria, then the flight information and symbology is not to appear on the display, and flow therefore passes to Block 92.

Step 92 is the setting of a flag to indicate that the flight data and symbology is not to be displayed, and from Block 92 flow then passes to Block 96. In Block 96, the open circle symbol representing the arrival slot is generated on the display at the appropriate time coordinates.

From Block 96, the flow passes back to Block 80, to begin the loop through for the next slot. If the flight being considered in test Block 90 meets the filter criteria, then flow passes from Block 90 to Block 94 wherein the flight data, ETA symbol, ETA envelope and Flight ID, or other selected parameters are generated. From Block 94, the flow passes to Block 95 wherein the open circle arrival slot symbol is drawn. From Block 95, flow passes to Block 98, where it is determined whether or not a Preferred Arrival Time had been set for the particular flight. If a Preferred Arrival Time has been set, flow passes to Block 100 wherein the circle drawn in Block 96 is filled in with a particular color or shading to distinguish it from other symbology. If the Preferred Arrival Time had not been set for the flight, the flow passes to Block 102, which is also the next step following Block 100. Having reached Block 102, the drawing of flight data associated with the particular assigned slot is complete, certain housekeeping chores are attended to and the flow then passes back to Block 80 for generation of the graphics associated with the next slot.

Figure 14:
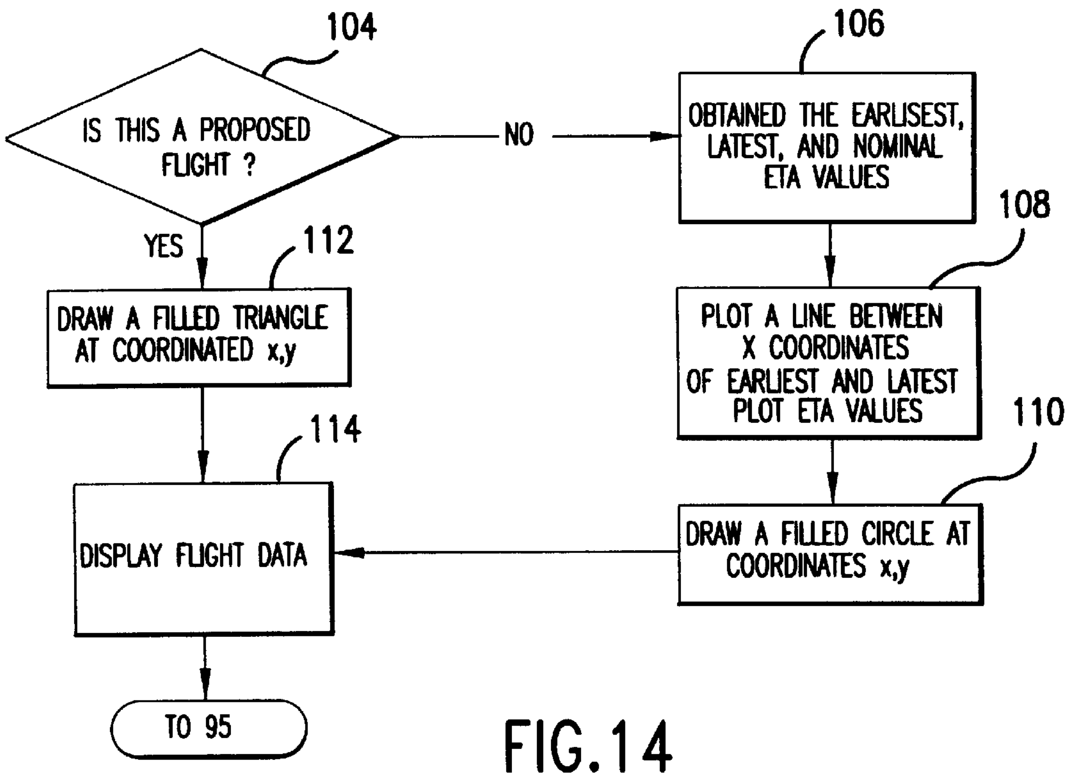
FIG. 14 is a flow chart for a routine for drawing flight data of the present invention.

The steps involved in drawing the flight data, Block 94, are further detailed in FIG. 14. The first step, test Block 104, is to distinguish whether the flight is a proposed flight or an airborne flight. If the flight is a proposed flight, the flow passes to Block 112 wherein the appropriate symbol is drawn at the particular estimated arrival time, assigned slot time coordinates. In the examples presented in FIGS. 1–5, proposed flights are indicated by a triangularly shaped symbol, but other shapes may be utilized. Further, the color, shading, shape or size of the symbol may be varied depending upon whether the flight is that of another air carrier, or the user's own. From Block 112, the flow passes to Block 114 wherein flight data which the user wishes to see is presented, such flight data having been pre-selected utilizing menu selection 210. From Block 114, the flow then passes to Block 95, as has previously been described.

If in test Block 104, the flight is determined to be an airborne flight, one which is currently in the air, the flow passes to Block 106. In Block 106, the earliest, latest and nominal ETA values are obtained so that the symbols 228 and 244 can be displayed. From Block 106, the flow passes to Block 108 to plot the line 244 between the X coordinates which represent the earliest and latest ETA values. From Block 108, flow passes to Block 110 wherein the symbol 228 is drawn at the estimated arrival time, assigned slot time coordinates representing the nominal ETA value. In the example of FIGS. 1–5, the symbol 228 is a filled circle, having a color or shading which distinguishes it from the other symbology being displayed. Here again, the symbology for the user's own aircraft is made distinguishable from the aircraft of other air carriers utilizing different colors or shading of filled circles, but could also be affected by varying the shape or size of the symbols. From Block 110, the flow passes to Block 114 and then to Block 95, as previously described.

Figure 15:
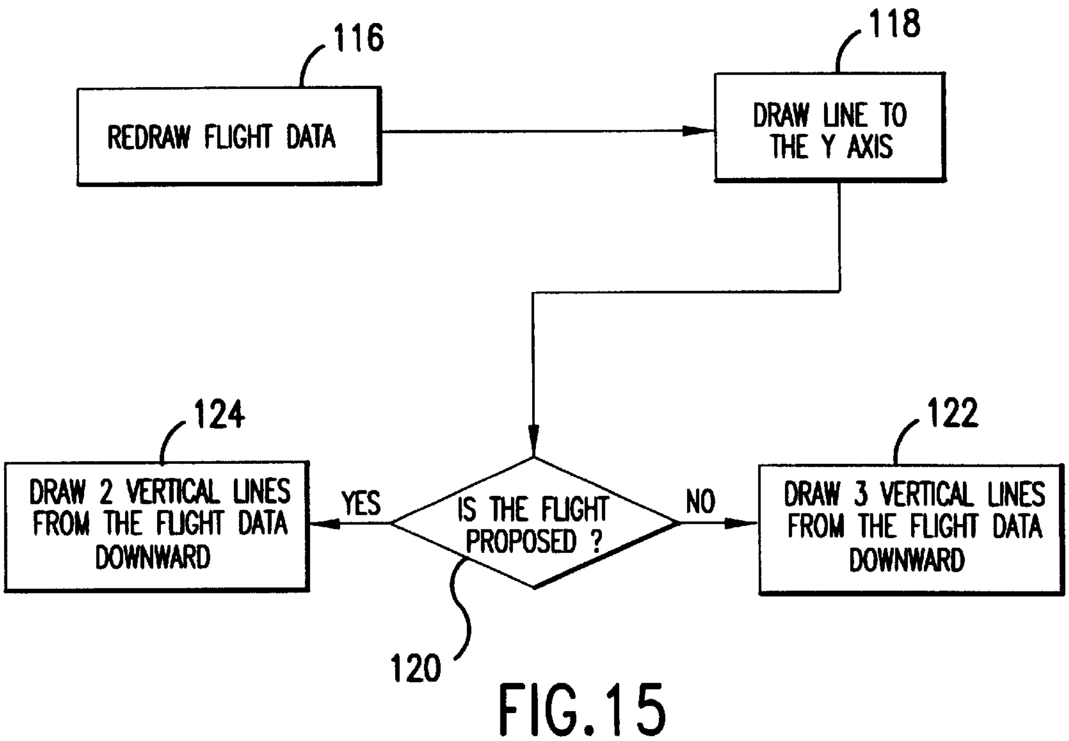
FIG. 15 is a flow chart for a routine for displaying the setting of a preferred arrival time of the present invention; and, FIG. 16 is a block diagram of the hardware architecture of the present invention.

During use of work station 360*a*, the user may select a flight for assignment of a Preferred Arrival Time. When such is initiated, the routine shown in FIG. 15 provides the display changes, as previously discussed with respect to FIGS. 3 and 4. As previously described, when the user sets a PAT, the aircraft flight symbology is dragged to the desired vertical position on the display. At that point, we begin with the step 116 in FIG. 15. In Block 116, the flight data including the ETA symbol 228, 230 are redrawn at the new location, the symbology and flight data indicia remaining also at the original location. From Block 116, flow passes to Block 118, wherein a horizontal line is drawn from the ETA symbol 228, 230 to the Y axis. From Block 118, flow passes to decision Block 120 wherein proposed flights are distinguished from airborne flights. If the flight is a proposed flight, flow passes to Block 124 wherein two vertical lines 240, 242 are drawn down to the X axis. One line 240 is drawn from the arrival time slot coordinates and the other line 242 extends from the ETA coordinates of the proposed flight. From there, the routine is exited. If the flight is in the air, then flow passes from Block 120 to Block 122 wherein three vertical lines 248, 250 and 252 are drawn to the X axis. The line 248 extends from the earliest ETA point, the line 250 extending from the coordinates of the preferred arrival slot, and the line 252 extending from the coordinate of the latest ETA point. From block 122, the routine would be exited.

The display 200 provides a temporal display that brings together all of the necessary data needed to properly control and monitor the arrival sequence of vehicles at a particular terminal. The graphical display overcomes many of the disadvantages of current text-based displays presented in a spreadsheet-like format, which are large and densely packed with relevant information, but overwhelming to be read and utilized by a human operator, especially where the arrival resource demand is very heavy. Display 200 makes possible an efficient human/computer interface that can be utilized to beneficially influence the arrival flow of vehicles into a terminal, whether it is an air terminal, sea terminal, truck terminal or a train or bus station, the principles are the same, and the estimated arrival time/assigned slot time temporal display presents the necessary data to a user in an easy to understand fashion. Use of the display 200 allows an operator to alter the route of a vehicle, i.e., change arrival fix, or adjust the speed of a vehicle to affect a change of the vehicle's ETA.

Although this invention has been described in connection with specific forms and embodiments thereof, it will be appreciated that various modifications other than those discussed above may be resorted to without departing from the spirit or scope of the invention. For example, equivalent steps may be substituted for those specifically shown and described, and certain features may be used independently of other features, and in certain cases, particular sequences of steps may be reversed or interposed, all without departing from the spirit or scope of the invention as defined in the appended Claims.

What is claimed is:

1. A method for displaying aircraft arrival management information for a particular airport from data supplied from an air traffic management system, including both airport status information and aircraft flight data, said method comprising the steps of:

providing means for processing and displaying the data supplied from an air traffic management system;

establishing a multiplicity of arrival time slots for the airport responsive to the airport status information;

assigning a plurality of flights identified by the aircraft flight data to appropriate ones of said multiplicity of arrival time slots;

forming a two dimensional graphic representation of said multiplicity of arrival time slots, said two dimensional graphic representation having an estimated arrival time coordinate and an assigned slot time coordinate and a multiplicity of first symbols positioned thereon to respectively represent said multiplicity of arrival time slots;

extracting an estimated time of arrival envelope from the aircraft flight data for at least one of said plurality of assigned flights; and, displaying said estimated time of arrival envelope on said two dimensional graphic representation for said at least one assigned flight.

2. The method as recited in claim 1 where said step of forming a two dimensional graphic representation of said multiplicity of arrival time slots includes the step of forming a first axis as said estimated arrival time coordinate and a second orthogonal axis as said assigned slot time coordinate.

3. The method as recited in claim 2 where said step of displaying said estimated time of arrival envelope includes the step of displaying a line having one endpoint defined by a flight's latest potential estimated time-of-day of arrival and an opposing endpoint defined by the flight's earliest estimated time-of-day of arrival.

4. The method as recited in claim 3 where said estimated time of arrival envelope includes the step of displaying a second symbol positioned on said line to designate a time-of-day representing the flights expected time-of-day of arrival.

5. The method as recited in claim 1 where said step of forming a two dimensional graphic representation of said multiplicity of arrival time slots includes the step of designating a first relative time span for a portion of said assigned flights having a relative time of arrival less than a first predetermined value by displaying said first relative time span with a background color band different from a background color of a second relative time span.

6. The method as recited in claim 5 where said step of forming a two dimensional graphic representation of said multiplicity of arrival time slots includes the step of designating a third relative time span for a portion of said assigned flights having a relative time of arrival greater than a second predetermined value by displaying said third relative time span with a background color band different from a background color of said second relative time span.

7. The method as recited in claim 1 where said step of forming a two dimensional graphic representation of said multiplicity of arrival time slots includes the step of positioning said multiplicity of first symbols along an angular path with respect to said estimated arrival time coordinate and said assigned slot time coordinate.

8. The method as recited in claim 7 where said step of forming a two dimensional graphic representation of said multiplicity of arrival time slots includes the step of spacing said first symbols responsive to an acceptance rate of the particular airport at a corresponding time-of-day.

9. The method as recited in claim 1 where said step of forming a two dimensional graphic representation of said multiplicity of arrival time slots includes the step of zooming in to increase the spacing between increments of said estimated arrival time coordinate and said assigned slot time coordinate responsive to a command input by a user.

10. The method as recited in claim 1 where said step of forming a two dimensional graphic representation of said multiplicity of arrival time slots includes the step of indicating any of the multiplicity of arrival time slots that are closed.

11. The method as recited in claim 4 further comprising the step of assigning a preferred arrival time to a particular one of said assigned flights by using a coordinate input device to drag said second symbol for said assigned flight to new coordinates representing a desired arrival time slot and displaying a third symbol overlaying a respective one of said first symbols.

12. The method as recited in claim 11 where said step of assigning a preferred arrival time includes the step of displaying lead lines extending between said first symbol of said desired arrival time slot and a respective time scale on each of said first and second axes.

13. A method for displaying vehicle arrival management information for a particular terminal having a multiplicity of arrival time slots to which at least a portion thereof are assigned to particular vehicles, said method comprising the steps of:

providing a display device and a processor in communication with a vehicle traffic management system;

forming a two dimensional graphic representation of the multiplicity of arrival time slots, said two dimensional graphic representation having an estimated arrival time coordinate and an assigned slot time coordinate and a multiplicity of first symbols positioned thereon to respectively represent the multiplicity of arrival time slots;

identifying which of the multiplicity of arrival time slots have a vehicle assigned thereto and displaying identification indicia therefor adjacent to a respective first symbol;

obtaining vehicle data including a latest estimated time-of-day of arrival, an expected estimated time-of-day of arrival, and an earliest estimated time-of-day of arrival for at least a portion of the assigned vehicles from the vehicle traffic management system; and, displaying a representation of an estimated time-of-day of arrival envelope for said portion of the assigned vehicles, said estimated time of arrival envelope representation including an indication of the latest estimated time-of-day of arrival, the expected estimated time-of-day of arrival, and the earliest estimated time-of-day of arrival.

14. The method as recited in claim 13 where said step of forming a two dimensional graphic representation of the multiplicity of arrival time slots includes the steps of providing a first axis defined by said estimated arrival time coordinate and providing a second orthogonal axis defined by said arrival slot coordinate.

15. The method as recited in claim 13 further comprising the step of inputting a preferred arrival time for at least one vehicle and displaying a symbol representing said at least one vehicle in overlaying relationship with respect to a symbol representing a desired one of said arrival time slots corresponding to said preferred arrival time.

16. The method as recited in claim 13 where said step of displaying a representation of an estimated time-of-day of arrival envelope includes the step of displaying a line positioned at a relative time defined by a respective assigned time slot, said line extending from an endpoint designated by the earliest estimated time-of-day of arrival to an endpoint designated by the latest potential estimated time-of-day of arrival.

17. The method as recited in claim 13 where said step of identifying includes the step identifying proposed flights input by a user and selective display thereof.

18. The method as recited in claim 15 where the step of inputting a preferred arrival time includes the step of assigning a preferred arrival time to said at least one vehicle by using a coordinate input device to drag said symbol for said at least one vehicle to new coordinates representing a desired arrival time slot and displaying another symbol overlaying said symbol representing said desired arrival time slot.

19. A method of temporally displaying arrival management information for a particular terminal having a multiplicity of arrival time slots to which at least a portion thereof are assigned to particular vehicles, said method comprising the steps of:

providing a display device and a processor in communication with a transportation database;

forming a two dimensional graphic representation of the multiplicity of arrival time slots, said two dimensional graphic representation having an estimated arrival time coordinate and an assigned slot time coordinate and a multiplicity of first symbols positioned thereon to respectively represent the multiplicity of arrival time slots;

identifying which of the multiplicity of arrival time slots have vehicles assigned thereto and displaying identification indicia therefor adjacent respective ones of said multiplicity of first symbols;

obtaining vehicle data including a latest estimated time-of-day of arrival, an expected estimated time-of-day of arrival, and an earliest estimated time-of-day of arrival for at least a portion of the assigned vehicles from the transportation database; and, displaying a representation of an estimated time-of-day of arrival envelope for said portion of the assigned vehicles, said estimated time of arrival envelope representation including an indication of the latest estimated time-of-day of arrival, the expected estimated time-of-day of arrival, and the earliest estimated time-of-day of arrival.

20. The method as recited in claim 19 where said step of forming a two dimensional graphic representation of the multiplicity of arrival time slots includes the steps of providing an X-axis defined by said estimated arrival time coordinate and providing a Y-axis defined by said arrival slot time coordinate.

* * * * *